(No Model.) 2 Sheets—Sheet 1.
M. QUEEN.
CAR FENDER.
No. 564,645. Patented July 28, 1896.
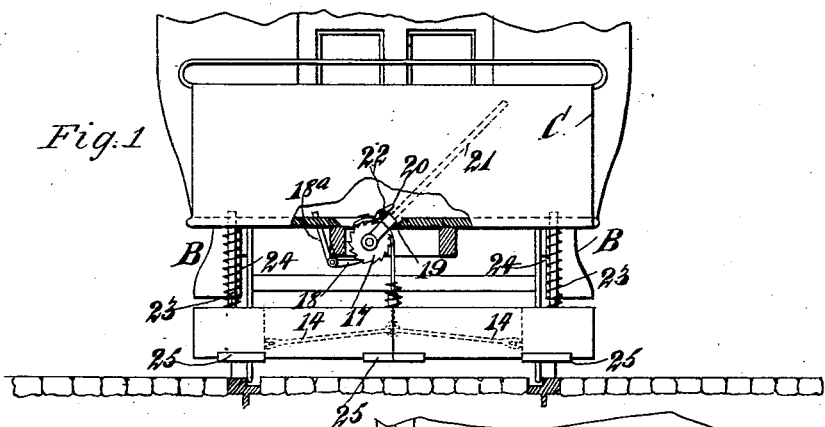
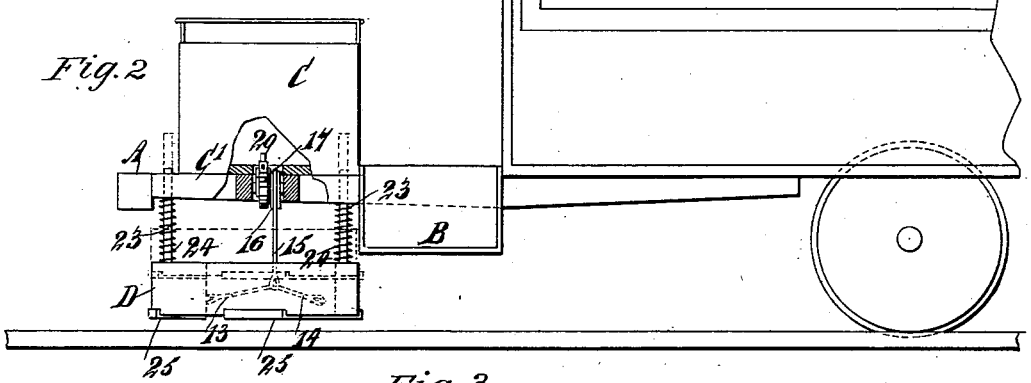
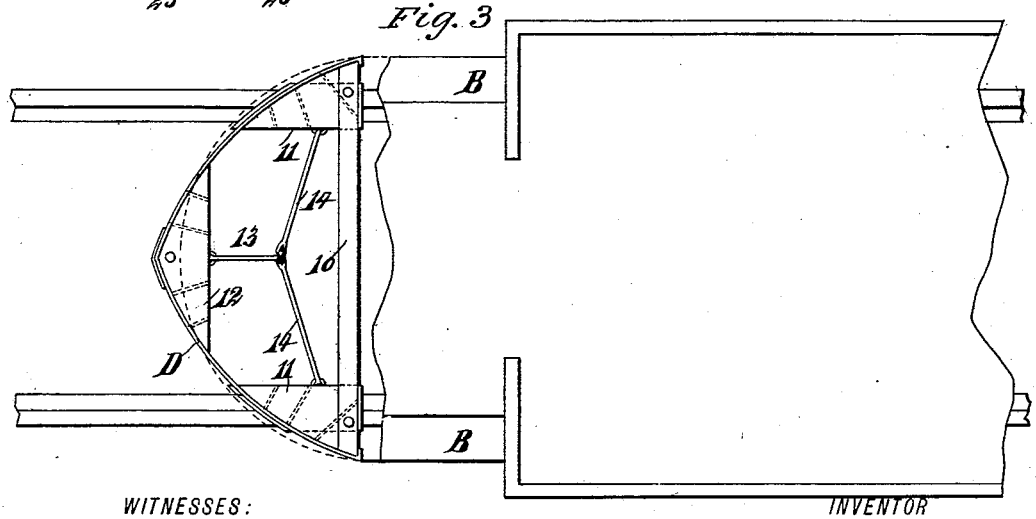
WITNESSES:
J. B. Walker
INVENTOR
M. Queen
BY
ATTORNEYS.

(No Model.)  2 Sheets—Sheet 2.
M. QUEEN.
CAR FENDER.
No. 564,645. Patented July 28, 1896.
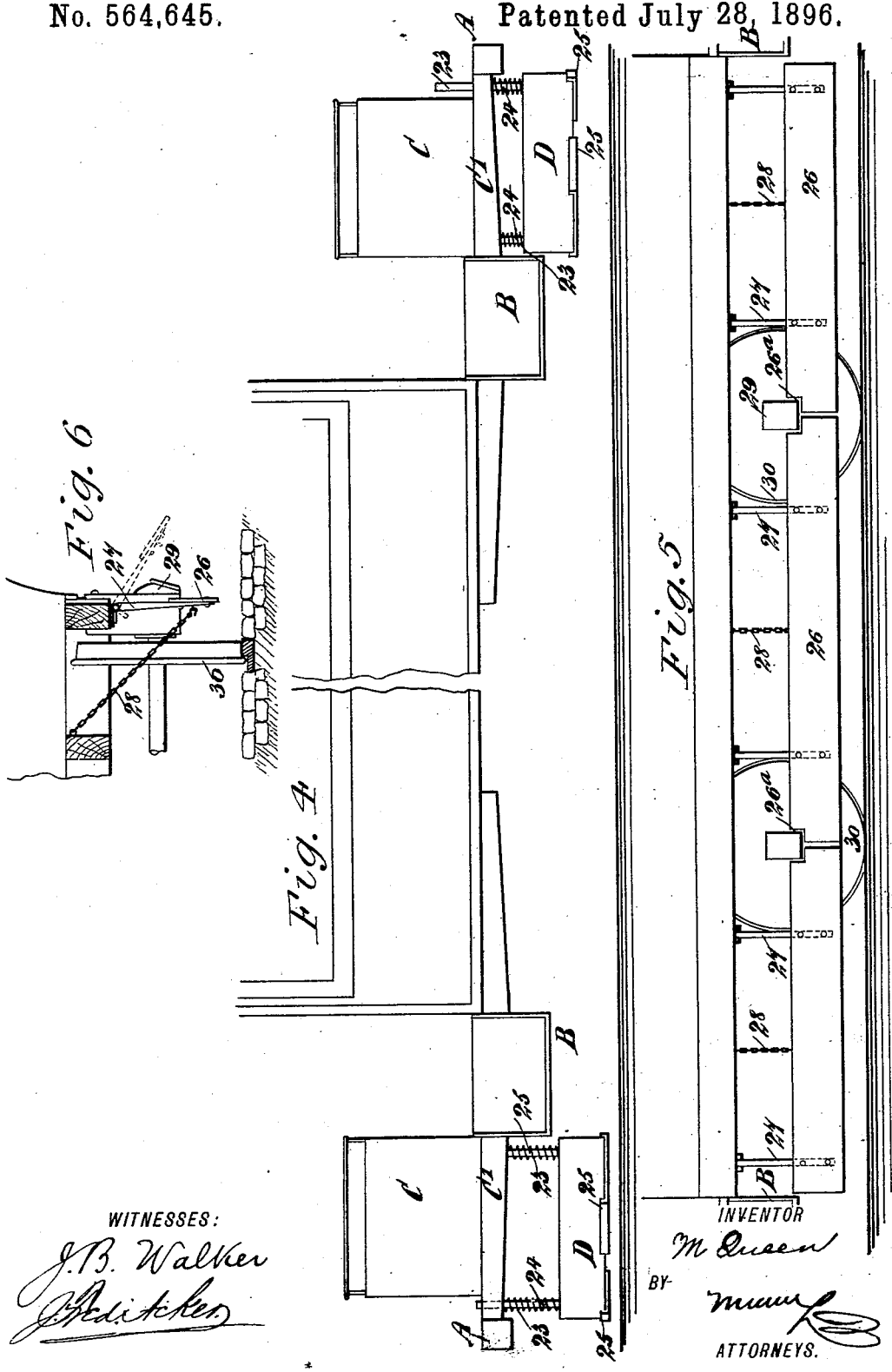
WITNESSES:
J. B. Walker
INVENTOR
M. Queen
BY
ATTORNEYS.
THE NORRIS PETERS CO., PHOTO-LITHO., WASHINGTON, D. C.

UNITED STATES PATENT OFFICE.

MONTGOMERY QUEEN, OF BROOKLYN, NEW YORK, ASSIGNOR TO VIOLETTA S. QUEEN, OF SAME PLACE.

CAR-FENDER.

SPECIFICATION forming part of Letters Patent No. 564,645, dated July 28, 1896.

Application filed January 2, 1896. Serial No. 574,070. (No model.)

*To all whom it may concern:*

Be it known that I, MONTGOMERY QUEEN, of Brooklyn, in the county of Kings and State of New York, have invented a new and useful Improvement in Car-Fenders, of which the following is a full, clear, and exact description.

My invention relates to an improvement in car-fenders; and the object of the invention is to provide a car-fender adapted for attachment to any kind of a surface car, which car-fender will be of somewhat circular form, extending from the front of the car in direction of each step and terminating at the outer point of the steps or at a point beyond the same, thus compelling any object that may contact with the fender to be carried beyond the track and also beyond possible contact with any projection at the side of the car.

Another object of the invention is to so construct the fender that it may be expeditiously and conveniently raised or lowered.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a front elevation of the car-fender and a partial front elevation of the car, a portion of the platform being in section. Fig. 2 is a partial side elevation of one end of the car, a part of the platform being in section, and likewise a side elevation of the improved fender. Fig. 3 is a partial plan view of the platform of a car and likewise a plan view of the fender, the platform being broken away to disclose the latter. Fig. 4 is a partial side elevation of a car, illustrating the application of the fender to both ends thereof, one fender being raised and the other lowered. Fig. 5 is a partial side elevation of the car, illustrating the application thereto of the fenders at the side; and Fig. 6 is a vertical section through a portion of a side of a car and illustrating an end view of the side fender.

According to my invention the platform A of the car is extended forwardly by means of sills C' beyond the dashboard C of the car, and the steps B are placed in the usual position, so that the platform projects forwardly from the steps and the steps hang from the platform. The fender D is formed on the arc of a circle, and is preferably made of sheet iron or of a like metal, and the said fender is pointed at its forward central surface.

The fender extends over the space beneath the platform and forward of the steps, and the form of the fender is such that its width at the rear edge will be equal to the distance between the most distant edges of the two steps B, so that the steps are shielded from engagement with an obstruction on the car.

A block 11 is secured, preferably, to each side of the inner face of the fender D, being attached likewise to a rear sill or cross-bar 10, and a block 12 is also preferably secured to the forward portion of the aforesaid fender, as is best shown in Fig. 3.

A link 13 is ordinarily pivotally secured to the forward block 12 of the fender, and is in like manner attached to links 14, which are pivotally connected with the side blocks 11, and the links where they are connected are attached to a cable 15 of any approved character, and the said cable is carried upward over a suitable drum or pulley 16, journaled in the platform of the car at ordinarily a central point immediately at the back of the dashboard C. The aforesaid drum 16 is attached in any suitable or approved manner to a ratchet-wheel 17, and the said ratchet-wheel 17 is engaged ordinarily by a spring-controlled pawl 18, operated through the medium of a shank 18$^a$, which extends upward through the platform of the car. A yoke 19 is preferably made to span the ratchet-wheel 17, and the said yoke is provided with a socket 20 to receive a lever 21, or the said lever may be integral with the said socket, and the yoke carrying the socket may be likewise connected with the shaft on which the drum or pulley 16 and the ratchet-wheel 17 are located. The yoke 19 is provided with a dog 22, and the said dog is adapted for engagement with the ratchet-wheel, and by rocking the lever 21 the ratchet-wheel will be revolved and the cable 15 wound on the pulley 16, so as to raise the fender D, and by disengaging the dog 22 and pawl 18 from the aforesaid ratchet-wheel the fender will readily drop toward the ground.

The fender is ordinarily provided with one or more, preferably three, rods 23, which extend upward in suitable bearings in the platform or in an equivalent support, and are surrounded by springs 24, serving to throw the fender to a lower position when released from its lifting device.

In the operation of this fender when it is lowered to operative position and engages an obstruction the obstruction will be carried either to the right or to the left from the rail and delivered at one side of the tracks. The projection of the fender beyond the steps serves to carry an engaged obstruction laterally and prevent it from being interfered with by the step or any overhanging portion of the body of the car liable to strike the object.

The fender is exceedingly simple, durable, and economic, and is also preferably provided with wear plates or surfaces 25, made of a suitable material and secured to the bottom of the fender at such points as to contact with the rails of the track and even with any projection that may occur between the rails, as shown particularly in Figs. 1 and 2.

In addition to the fenders employed at the ends of the car I also preferably use side fenders 26, and these latter fenders are particularly adapted to prevent persons from being drawn under or from falling under the car in the path of the wheels. These side fenders consist usually of one or more boards or plates 26, arranged longitudinally beneath the side portions of the car outside of the wheels 30. The said side fenders are also preferably provided with recesses 26ª at their ends or where they are brought in the vicinity of the axle-boxes 29. The side fenders are attached to hangers 27 in any approved manner, and these hangers are hinged at their upper ends to the body of the car, in order that the side fenders may be carried to the dotted position shown in Fig. 6 for the purpose of reaching the running-gear of the car. The side fenders are normally held in the vertical position shown in Figs. 5 and 6 by attaching chains 28 or their equivalents to the backs of the said fenders and to a convenient point on the truck or body portion of the car.

It will be understood that the side fenders extend practically from the steps at one end of the car to the steps at the opposite end of the car, and that the fenders are so hung that their outer faces will be practically flush with the outer edges of the lower steps of the car.

Having thus described my invention, I claim as new and desire to secure by Letters Patent—

1. A fender, consisting of a curved band, a cross-bar at the rear portion of said band, a block secured to each end of the cross-bar, the blocks being respectively connected to the ends of the band, a third block secured to the inner front portion of the band, three links connected with each other and respectively with the blocks, a drum connected to the links, and guide-rods respectively rigidly carried by the blocks, substantially as described.

2. The combination with a car having a platform and a step extended downwardly from each side of said platform, the platform projecting forward of the steps, of a curved band, a cross-bar connected to the rear portion of said band, a block attached to each end of the cross-bar and respectively to the ends of the band, a third block attached to the inner front portion of the band, three links connected with each other and respectively connected with the blocks, a drum mounted on the platform and connected with the links, a rod rigidly carried by each block, the rods sliding in the platform, and springs embracing the rods, substantially as described.

3. A fender consisting of a curved band, a cross-bar at the rear of said band, a plurality of blocks in connection with the band, a link connected to each block, the links being also connected with each other, a drum in connection with the links, and guide-rods respectively rigidly carried by the blocks, substantially as described.

MONTGOMERY QUEEN.

Witnesses:
J. FRED. ACKER,
JNO. M. RITTER.